United States Patent
Rouaud et al.

(10) Patent No.: US 10,987,800 B2
(45) Date of Patent: Apr. 27, 2021

(54) ROTARY SUPPLEMENTAL AXIS FOR ROBOT

(71) Applicant: ABB Schweiz AG, Baden (CH)

(72) Inventors: Didier Rouaud, Bloomfield, MI (US);
Michael G. Nelson, Oxford, MI (US);
Srinivas Nidamarthi, Troy, MI (US);
Rui Li, Rochester, MI (US)

(73) Assignee: ABB Schweiz AG, Baden (CH)

( * ) Notice: Subject to any disclaimer, the term of this patent is extended or adjusted under 35 U.S.C. 154(b) by 264 days.

(21) Appl. No.: 15/814,756

(22) Filed: Nov. 16, 2017

(65) Prior Publication Data

US 2018/0071912 A1 Mar. 15, 2018

Related U.S. Application Data (63) Continuation of application No. PCT/US2016/032704, filed on May 16, 2016.

(60) Provisional application No. 62/162,705, filed on May 16, 2015.

(51) Int. Cl.
*B25J 9/10* (2006.01)
*B25J 9/00* (2006.01)
*B25J 9/04* (2006.01)

(52) U.S. Cl.
CPC ............ *B25J 9/102* (2013.01); *B25J 9/0009* (2013.01); *B25J 9/0084* (2013.01); *B25J 9/046* (2013.01)

(58) Field of Classification Search
CPC ................................ B25J 9/0009; B25J 9/102
See application file for complete search history.

(56) References Cited

U.S. PATENT DOCUMENTS

| 4,453,221 A | 6/1984 | Davis et al. |
| 4,589,816 A | 5/1986 | Eberle et al. |
| 4,661,040 A * | 4/1987 | Cigna .................. B21D 43/105 414/744.5 |
| 4,904,148 A | 2/1990 | Larsson |
| 5,600,235 A | 2/1997 | Mauletti |

(Continued)

FOREIGN PATENT DOCUMENTS

WO   2015018512 A1   2/2015

OTHER PUBLICATIONS

International Search Report and Written Opinion, PCT/US2016/032704, ABB Technology AG, dated Jul. 17, 2016, 10 pages.

*Primary Examiner* — Michael S Lowe
(74) *Attorney, Agent, or Firm* — Taft Stettinius & Hollister LLP (57) ABSTRACT

A robotic system and method that includes a robot having one or more axes of movement and which can be coupled to a supplemental axis unit that is structured to rotatably displace the robot about a supplemental axis. The robot can be coupled to a rotatable wheel portion of a table unit of the supplemental axis unit. The wheel portion can be operably coupled to a drive unit having a motor that provides rotational power for the rotational displacement of the wheel portion, and thus the robot, about the supplemental axis of the supplemental axis unit. The robotic system can also include one or more controllers that can be configured to dynamically control or coordinate the movement of both the robot about the one or more axes of the robot and the rotational displacement of the wheel portion, and thus the robot, about the supplemental axis.

16 Claims, 11 Drawing Sheets

(56) References Cited

U.S. PATENT DOCUMENTS

| | | | |
|---|---|---|---|
| 8,777,555 B1* | 7/2014 | Balbir | F03B 13/264 |
| | | | 415/3.1 |
| 2006/0102072 A1 | 5/2006 | Inada et al. | |
| 2011/0237386 A1 | 9/2011 | Hirtt et al. | |
| 2012/0325142 A1 | 12/2012 | Takahashi | |
| 2013/0309055 A1* | 11/2013 | Yoshinaga | B25J 18/04 |
| | | | 414/680 |
| 2014/0166843 A1* | 6/2014 | Bertocchi | H01Q 3/08 |
| | | | 248/550 |
| 2019/0160694 A1* | 5/2019 | Inoue | F16H 1/145 |

* cited by examiner

ROTARY SUPPLEMENTAL AXIS FOR ROBOT

BACKGROUND

Embodiments of the present application generally relate to systems and methods for manipulation of robotic equipment. More particularly, but not exclusively, embodiments of the present application relate to multiple axes robotic systems.

Industrial robots are often constructed, as well as programmed, to maneuver about one or more axes of the robot, and moreover, may move about one to six axes of the robot. Such maneuverability can include the robot moving along one or more paths and/or points so that the robot can be positioned to perform work at various locations on a work piece. A variety of different types of work can be performed by the robot on a variety of different types of work pieces, including, for example, automotive work piece, including, but not limited to, assembled or unassembled portions of the body of a vehicle or other components of a vehicle. For example, such work performed by such robots can include, but is not limited to, painting, grinding, polishing, deburring, welding, and/or a combination thereof, among other types of work, that make a physical and/or cosmetic change to the work piece. Examples of such work on a workpiece by the robot can further include, but is not limited to, moving the work piece, such as, for example, by the robot or other device(s) or tool(s) coupled to the robot picking up and moving the workpiece from one or more locations.

However, implementations of industrial robots in production can be limited by the fixed work envelope of the robots. Prior solutions to increase work envelopes having included the use of rail systems. Yet, such approaches can be limited, including, for example, due to various constraints that can relate to the type of workspace in which the robot(s) is/are to be implemented, and/or the type of additional envelope size that may be obtained by such an approach, among other constraints. Moreover, such approaches often involve increasing both the complexity and the size of the footprint of the robotic system.

BRIEF SUMMARY

An aspect of an embodiment of the present application is a robot having one or more axes of movement and a supplemental axis unit having a table unit and a tower housing. The table unit can be attached to the tower housing and includes a wheel portion that can be structured to be coupled to the robot. Additionally, the wheel portion can be selectively rotatably displaceable, at least when the robot is coupled to the wheel portion, about a supplemental axis and relative to at least the tower housing. Further, the supplemental axis can be different than the one or more axes of the robot.

Another aspect of an embodiment of the present application is a robotic system that includes a supplemental axis unit having a table unit and a tower housing, the table unit having a wheel portion that is selectively rotatably displaceable about a supplemental axis and relative to at least the tower housing. The robot can have one or more axes of movement, such as, for example, be a six axis robot having six degrees of freedom. Further, the robot can be coupled to the wheel portion and selectively rotatably displaceable with the rotatable displacement of the wheel portion about the supplemental axis. Additionally, the supplemental axis is different than the one or more axes of the robot. The robotic system can further include at least one controller that is configured to coordinate both (1) the movement of the robot about the one or more axes, and (2) the rotatable displacement of the robot about the supplemental axis.

Another aspect of an embodiment of the present application is a method that includes displacing a robot about one or more axes of the robot, as well as rotatably displacing the robot about a supplemental axis of a supplemental axis unit, the supplemental axis being different than the one or more axes of the robot. The method can also include transmitting, from one or more controllers, a primary instruction for the displacement of the robot about the one or more axes of the robot, as well as transmitting, from the one or more controllers, a secondary instruction for the displacement of the robot about the supplemental axis of the supplemental axis unit.

BRIEF DESCRIPTION OF THE DRAWINGS

The description herein makes reference to the accompanying figures wherein like reference numerals refer to like parts throughout the several views.

The foregoing summary, as well as the following detailed description of certain embodiments of the present application, will be better understood when read in conjunction with the appended drawings. For the purpose of illustrating the application, there is shown in the drawings, certain embodiments. It should be understood, however, that the present application is not limited to the arrangements and instrumentalities shown in the attached drawings. Further, like numbers in the respective figures indicate like or comparable parts. Additionally, the figures are not drawn to scale and the proportions of certain parts have been exaggerated for convenience of illustration.

DESCRIPTION OF THE ILLUSTRATED EMBODIMENTS

In the accompanying drawings, structures and methods are illustrated that, together with the detailed description provided below, describe aspects of systems and methods concerning seventh-axis robotic systems. Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. Further, it will be noted that a single component may be designed as multiple components or that multiple components may be designed as a single component. The phrase "at least one of" followed by a list of two or more items, such as "A, B or C," means any individual one of A, B or C, as well as any combination thereof.

Figure 1:
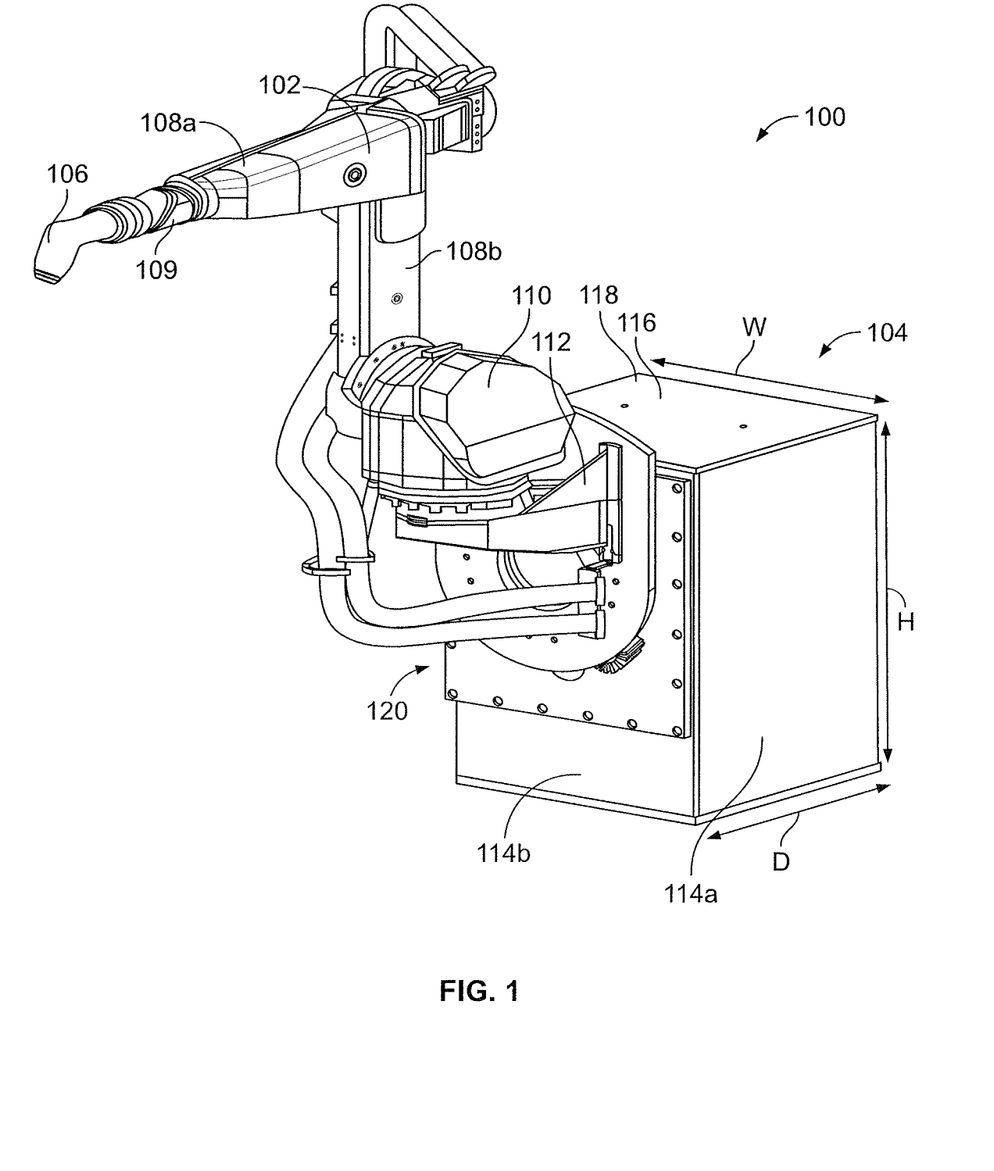
FIG. 1 illustrates a front side perspective view of an exemplary robotic system having a robot and a supplemental axis unit according to an illustrated embodiment of the present application.

FIG. 1 illustrates a front side perspective side view of an exemplary robotic system 100 having a robot 102 and a supplemental axis unit 104 according to an illustrated embodiment of the present application. The robot 102 can be a single axis robot or a multiple axis robot. For example, according to certain embodiments, the robot 102 is a six axis robot that has six degrees of freedom. Examples of such robots can include, but is not limited to, an IRB 5500 robot from ABB, Inc. of Auburn Hills, Mich. While certain embodiments of the present application are discussed herein in terms of six axis robots, robots having other number of axes, or degrees of freedom, can also be utilized with the robotic system 100 of the present application, and moreover, used with the supplemental axis unit 104.

According to certain embodiments, and as discussed below with respect to FIG. 10, the robot 102 can include and/or be in electrical communication with a control system that can include one or more controllers. For example, according to certain embodiments, the robot 102 can include and/or be electrically coupled to one or more controllers that may, or may not, be discrete processing units, such as, for example, a single controller or any number of controllers. The controller(s) can take a variety of different forms, and can be configured to execute program instructions to perform tasks associated with operating robot 102, and moreover, to operate the robot 102 to perform various functions, such as, for example, but not limited to, tasks described herein. In one form, the controller(s) is/are microprocessor based and the program instructions are in the form of software stored in one or more memories. However, it is alternatively contemplated that one or more of the controllers and the program instructions executed thereby may be in the form of any combination of software, firmware and hardware, including state machines, and may reflect the output of discreet devices and/or integrated circuits, which may be co-located at a particular location or distributed across more than one location, including any digital and/or analog devices configured to achieve the same or similar results as a processor-based controller executing software or firmware based instructions.

According to certain embodiments, the robot 102 can include an end effector 106 that is mounted to a wrist 109 of the robot 102. In one form, the end effector 106 is, and/or is mounted to, a tool. According to such embodiments, the robot 102 is operative to position the effector 106 and/or tool at locations within a reach work envelope or workspace of the robot 102 that accommodate the robot 102 performing work on a workpiece. For example, according to certain embodiments, the end effector 106 may be, or may be coupled to, a tool that is a painting or coating spraying device or tool. The wrist 109 of the robot 102 can be coupled to one or more arms 108a, 108b. For example, according to the illustrated embodiment, the one or more arms 108a, 108b includes a first arm 108a that is operably coupled to a second arm 108b such that the first arm 108a can move relative to the second arm 108b, and vice versa. Further, according to certain embodiments, the arms 108a, 108b can be positioned between the wrist 109 and a robot base unit 110 of the robot 102.

The robot base unit 110 is securely coupled to the supplemental axis unit 104. For example, according to certain embodiments, the robot base unit 110 is coupled to, or includes, a foot unit 112 that can be mounted or otherwise coupled to the supplemental axis unit 104. According to certain embodiments, the foot unit 112 can be directly or indirectly coupled to the robot 102 and/or the supplemental axis unit 104 in a variety of different manners, including, for example, through the use of one or more mechanical fasteners, including, but not limited to, bolts, screws, pins, and clamps, as well as other mechanical fasteners. However, the foot unit 112 can be coupled to the robot 102 and/or supplemental axis unit 104 in a variety of different manners. Additionally, according to certain embodiments, rather than being a discrete component, the foot unit 112 can be part of the robot 102 or the supplemental axis unit 104. Further, the robot 102, foot unit 112, and/or supplemental axis unit 104 can be configured to accommodate the coupling or mounting of the robot 102 to the supplemental axis unit 104 in a variety of different orientations relative to the supplemental axis unit 104. For example, according to certain embodiments, the foot unit 112 can extend from the robot 102 and be configured for mounting of the robot 102 to portions of one or more generally vertical, horizontal, and/or slanted sidewalls 114a, 114b, 114c, 114d (FIG. 3) and/or upper or bottom walls 116a, 116b of a tower housing 118 of the supplemental axis unit 104. Moreover, according to certain embodiments, the robot 102, foot unit 112, and/or supplemental axis unit 104 can be configured to accommodate the mounting of the robot 102 at a variety of orientations relative to the supplemental axis unit 104.

Figure 2:
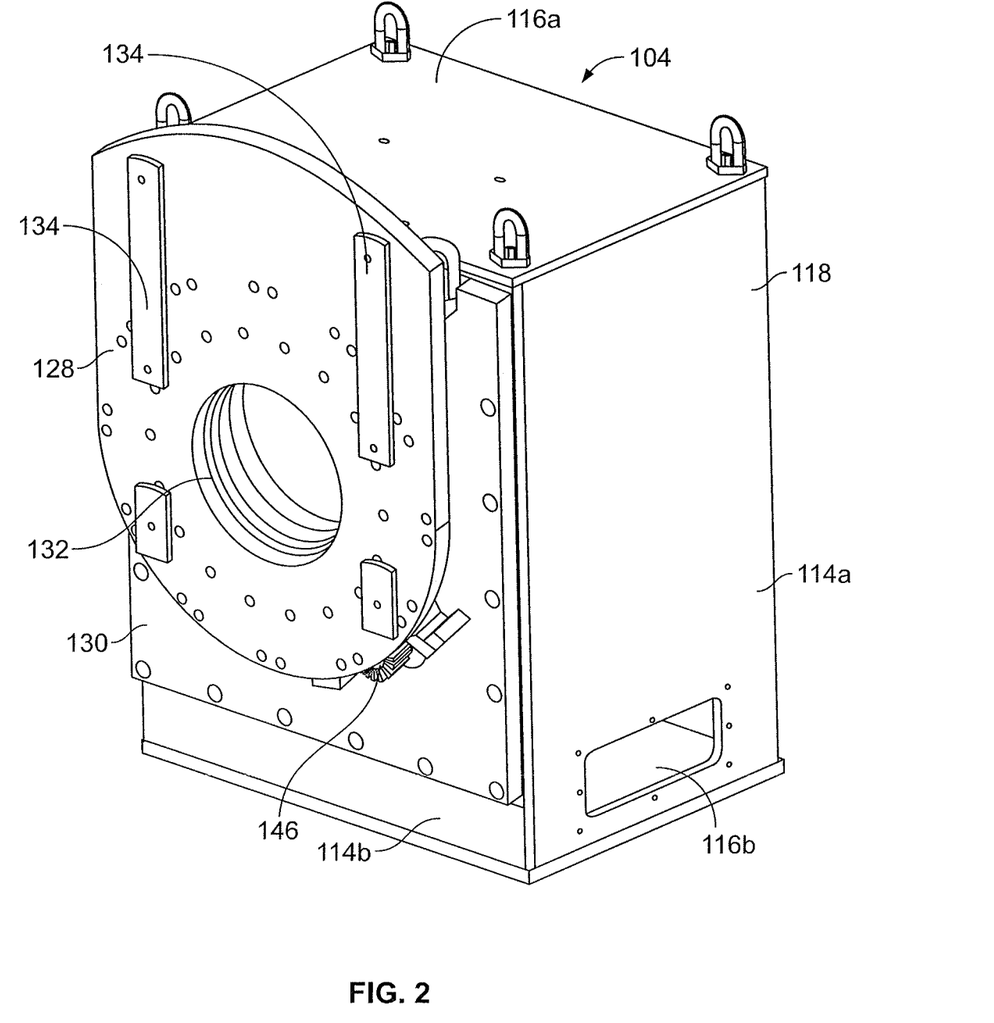
FIG. 2 illustrates a front side perspective view of an exemplary supplemental axis unit according to an illustrated embodiment of the present application.

FIG. 2 illustrates a front side perspective view of an exemplary supplemental axis unit 104 according to an illustrated embodiment of the present application. The supplemental axis unit 104 can include the tower housing 118, a table unit 120, and a drive unit 122. The sidewalls 114a, 114b, 114c, 114d, upper wall 116a, 116b of the tower housing 118 can generally define an inner region 126 of the tower housing 118 that can house at least a portion of the drive unit 122. Further, the walls 114a-d, 116a, 116b of the tower housing 118 can be configured in a number of different manners, and include fewer or additional walls. Moreover, the tower housing 118 can be configured to have a variety of shapes and sizes. For example, as shown by at least FIGS. 2 and 3, according to certain embodiments, tower housing 118 can have a generally rectangular or square shape. However, as shown in at least FIGS. 7A-9, the tower housing 118 and/or certain walls 114a-d, 116a, 116b can have other shapes and/or orientations.

Figure 3:
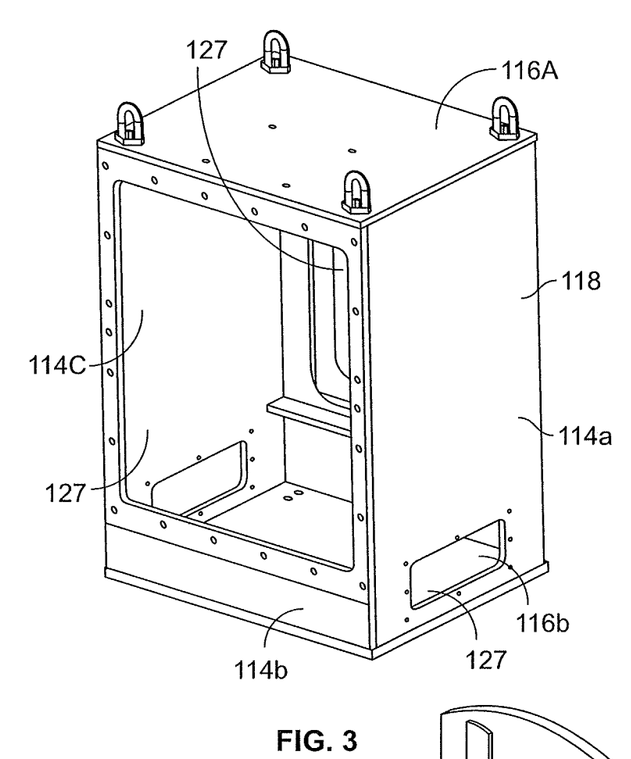
FIG. 3 illustrates an exemplary front side perspective view of a tower housing of an exemplary supplemental axis unit according to an embodiment of the present application.

As illustrated in at least FIG. 3, one or more of the walls 114b, 114d of the tower housing 118 can include openings or apertures 127 that are in communication with the inner region 126. Such apertures 127 can have a variety of different shapes and sizes that are sized to serve or accommodate one or more functions. For example, according to certain embodiments, a rear sidewall 114d of the tower housing 118 can include an opening or aperture 127 that is sized to provide external access to the inner region 126 of the tower housing 118. Other openings or apertures 127, such as, for example, those positioned on the opposing sidewalls 114a, 114c of the illustrated tower housing 118, can be sized to accommodate the passage of cables, provide vents for the passage or circulation of air to/from the inner region 126, and/or are used in connection with other equipment during the installation and/or maintenance of the supplemental axis unit 104 and/or the robotic system 100. According to other embodiments, the apertures 127 can be covered by one or more removable panels. Such panels can, according to certain embodiments, be utilized in connection with other aspects of the tower housing 118 to enable the tower housing 118 to generally have an explosion proof construction.

The size of the tower housing 118 can be based on a variety of considerations, such as, for example, the size of the robot 102, the size of the work envelope, and/or the function being performed by the robot 102, among other considerations. For example, as shown in at least FIGS. 2 and 3, according to the illustrated embodiment, the depicted tower housing 118 can have a height (as indicated by the "H" direction in FIG. 1) of 1400 millimeters (mm), a depth (as indicated by the "D" direction in FIG. 1) of 700 millimeters (mm), and a width (as indicated by the "W" direction in FIG. 1) of 1000 millimeters (mm). Yet, the supplemental axis unit 104 can have a variety of other sizes, as well as shapes, including, for example, being generally square, oval, circular, trapezoidal, polygonal, non-circular, and/or any combination thereof, among other shapes, sizes, and configurations.

Figure 4:
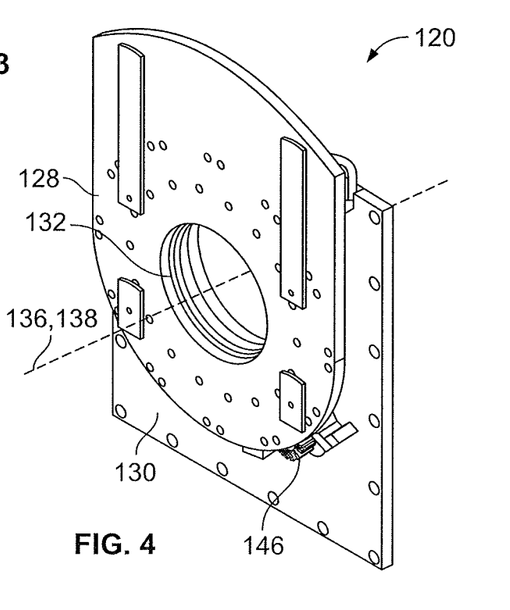
FIG. 4 illustrates a front side perspective view of a table unit according to an illustrated embodiment of the present application.

Referencing FIGS. 1, 2, and 4, according to the illustrated embodiment, the table unit 120 includes a wheel portion 128 and a fixed portion 130. The table unit 120 of the supplemental axis unit 104 can be coupled or mounted to the tower housing 118 in a variety of manners. For example, according to certain embodiments, a portion of the table unit 120, such as, for example, the fixed portion 130, can be securely coupled to the tower housing 118 through the use of at least one or more mechanical fasteners, such as, for example, bolts, screws, pins, and/or clamps, among other fasteners.

According to such an embodiment, the fixed portion 130 of the table unit 120 may remain in a relatively static position relative to at least the tower housing 118 during operation of the supplemental axis unit 104. Moreover, as discussed below, during selective rotation of the wheel portion 128 during operation of the supplemental axis unit 104, the position of the fixed portion 130 may generally remain relatively static.

The table unit 120 can include an opening 132 that extends through the wheel portion 128 and the fixed portion 130, and which is aligned with one or more openings or apertures 127 of the tower housing 118 so as to be fluid communication with the inner region 126 of the tower housing 118. Further, the opening 132 of the table unit 120, as well as the corresponding opening or aperture 127 of the tower housing 118, can be sized to accommodate the passage of one or more pneumatic, hydraulic and/or electrical connections or for tooling to pass from the inner region 126 of housing 200, through opening 132, and to the robot 102 and/or tooling installed on the robot 102. Further, according to certain embodiments, at least a portion of the opening 132 can be covered by the foot unit 112, the robot 102, and/or another cover or panel so as to at least attempt to prevent contaminants from entering the inner region 126 of the tower housing 118 and/or to at least attempt to maintain an explosion proof construction of the supplemental axis unit 104.

The wheel portion 128 is structured to be coupled to the robot 102. Moreover, the robot 102 can be securely mounted to the wheel portion 128, such as, for example, by one or more mechanical fasteners, among other connections, that can connect a foot unit 112 that is coupled to, or part of, the robot 102, to the wheel portion 128. According to certain embodiments, the wheel portion 128 can include supports 134, such as, for example, support brackets, that can facilitate the attachment of the robot 102 and/or the foot unit 112 to the wheel portion 128. Alternatively according to certain embodiments, the wheel portion 128 can be part of the foot unit 112 of the robot 102. According to certain embodiments, the supports 134 can be sized for a mating engagement with the foot unit 112, such as, a portion of one or both of the supports 134 and the foot unit 112 being matingly received in the other of the supports 134 of the foot unit 112 in a manner that may at least temporarily retain the foot unit 112 in engagement with the support 134. Additionally, or alternatively, one or both of the supports 134 and the foot unit 112 can have a matching or mating aperture or bolt pattern that accommodates the receipt of one or more mechanical fasteners that can facilitate the mounting of the foot unit 112 and/or robot 102 to the wheel portion 128.

The wheel portion 128 is pivotally or rotatably coupled to the fixed portion 130 such that an angular position of the wheel portion 128, and thus the robot 102 coupled to the wheel portion 128, relative to at least the fixed portion 130 and/or tower housing 118 is adjustable. Further, according to certain embodiments, the wheel portion 128 can be rotatable relative to the fixed portion 130 and/or supplemental axis unit 104 about a supplemental axis, such as, for example, a central wheel axis 136 that may or may not be shared with, or parallel to, a central axis 138 of the opening 132. According to certain embodiments, the robot 102 can be operably secured to the wheel portion 128 at a position at which a central axis of the robot 102 may extend generally along or share the same location as, or alternatively be offset from, the central wheel axis 136. The extent the angular position of the wheel portion 128 relative to the fixed portion 130 can be selectively rotated can vary for different embodiments. For example, according to certain embodiments, the table unit 120 can be structured to accommodate up to, or less than, a full 360 degrees of rotation of the wheel portion 128 relative to the fixed portion 130. Such selective rotation of the wheel portion 128, and thus the robot 102, can provide a supplemental axis for movement of the robot 102, and thereby enlarge the work envelope of the robot 102 relative to the envelope of the same robot 102 mounted to a fixed surface. Moreover, for example, selective operation of the supplemental axis unit 104 can adjust an angular position of the robot 102, thereby adding an axis of movement to the robot 102 that is in addition to the axis(es) provided by the robot itself. More specifically, for a robot having a six axis construction, such as, for example, the previously mentioned IRB 5500 robot from ABB, Inc., the additional axis provided by the supplemental axis unit 104 can allow the six axis robot 104 to maneuver, or be maneuvered, about seven axes.

Figure 5:
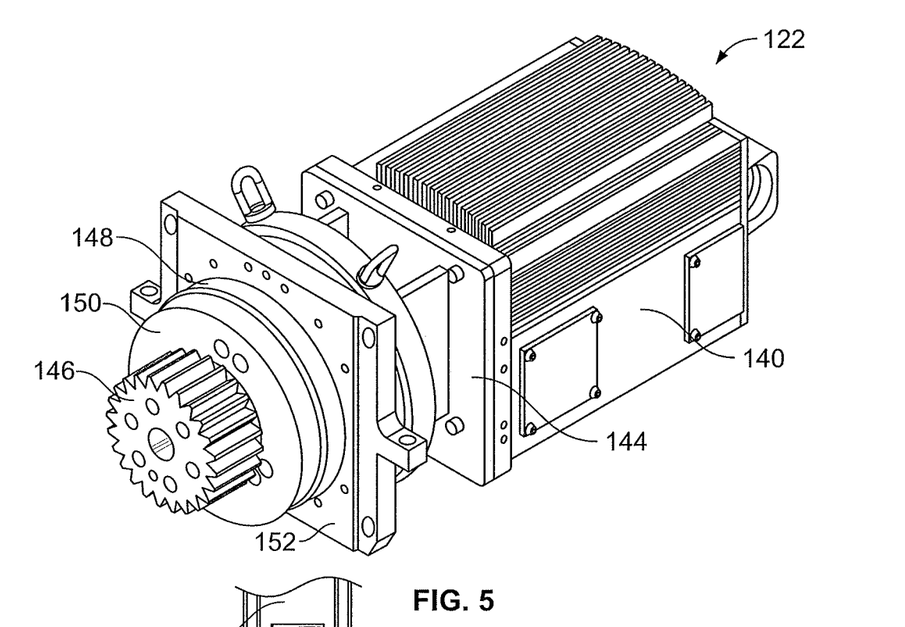
FIG. 5 illustrates a perspective view of a drive unit according to an illustrated embodiment of the present application.

The wheel portion 128 can be selectively rotatably displaced in a variety of different manners. For example, according to certain embodiments, the wheel portion 128 can be directly or indirectly coupled to a drive unit 122 that is configured to provide power utilized in the rotational displacement of the wheel portion 128 of the table unit 120, and thus provides power used for the rotation of the robot 102. The drive unit 122 can have a variety of different configurations. For example, as shown in FIG. 5, according to certain embodiments, the drive unit 122 can include a motor 140, such as, for example, an electric motor, including, but not limited to, an AC powered electric motor, that is coupled to a gear box 142. Moreover, for example, according to one aspect of the present teachings, the motor 140 can be a permanent magnet three-phase AC motor that is structured to run relatively smoothly through an entire speed range. Additionally, the motor 140 can be equipped with a brake for locking the motor 140 in a fixed position when the supplemental axis unit 104 is not actuated, such as during normal operating stoppage or emergency stoppage. Further, according to certain embodiments, the motor 140 and/or drive unit 122 can be structured to operate in potentially explosive environments.

According to certain embodiments, an output shaft of the motor 140, or a coupling element that is otherwise coupled to a rotatable output component of the motor 140, is coupled to an inlet gear of a gear box 142. The gear box 142 can be structured to provide speed and torque conversion for the rotational power provided by the motor 140. Moreover, the gear box 142 can be structured to reduce the rotational speed outputted by motor 140 in a manner that provides torque that can be utilized to rotatably displace the wheel portion 128 of the table unit 120, and thereby adjust a relative angular orientation of the wheel portion 128 and robot 102 so as to provide a supplemental axis for the movement of the robot 102. For example, according to certain embodiments, the gear box 142 can have a gear ratio of around, but not limited to, 171:1, among other gear ratios. Additionally, according to certain embodiments, the gear box 142 can be housed in a body 144 that can be securely coupled to at least a portion of the motor 140. For example, according to certain embodiments, the body 144 of the gear box 142 can be secured through the use of mechanical fasteners to an end of a motor housing of the motor 140 at which the output shaft generally outwardly extends.

The gear box 142 is operably coupled to a driver member 146 of the drive unit 122 that can directly or indirectly selectively drive the rotation of the wheel portion 128 of the table unit 120. Additionally, according to certain embodiments, the drive unit 122 can also include one or more input discs 148, 150 and an input plate 152 that can facilitate synchronization of the driver member 146 with the motor 140. Further, as discussed below with respect to at least FIGS. 7A-8B, the driver member 146 may or may not be housed within the inner region 126 of the tower housing 118 with other components of the drive unit 122, such as for example, the motor 140, gear box 142, input discs 148, 150, and/or the input plate 152.

Figure 6:
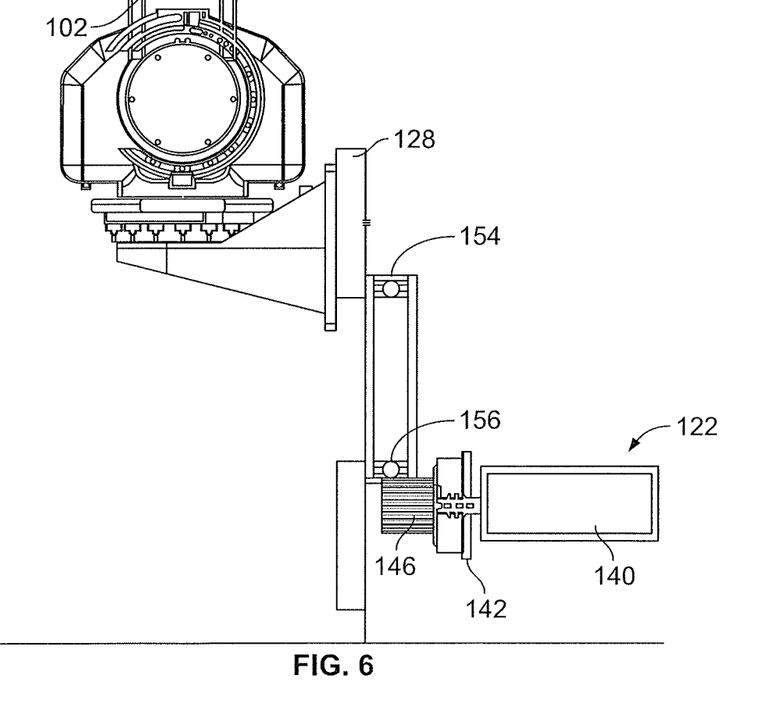
FIG. 6 illustrates a partial sectional view of a portion of an exemplary embodiment of a robotic system having a supplemental axis unit according to an illustrated embodiment of the present application.

FIG. 6 illustrates a schematic of a portion of a robotic system 100 in which the tower housing 118 has been excluded for clarity. As illustrated, according to certain embodiments, the driver member 146 is a pinion gear, among other types or forms of transmission components, that directly or indirectly interfaces with a driven member 154 of the wheel portion 128 of the table unit 120, such as, for example, a gear, among other types or forms of power transmission components. For example, according to other embodiments, the driver and driven members 146, 154 can include two or more mating gears, two or more sprockets, and/or pulleys that utilize belts or chains in the transmission of a rotational force(s). According to certain embodiments, the driven member 154 can be secured in a relatively static position relative to the wheel portion 128 of the table unit 120, and moreover, can be rotatable with the wheel portion 128 relative to the fixed portion 130 of the table unit 120. For example, according to the certain embodiments, the driven member 154 may be directly or indirectly secured to the wheel portion 128 at a relatively fixed location through the use of one or more mechanical fasteners, a welded attachment, and/or a press or interference fit, among other manners of attachment.

According to certain embodiments, an inner bore of the driven member 154 may be sized to accommodate the placement or mounting of the driven member 154 about and/or to an outer surface of a bearing 156, such as, for example, a slew bearing. According to such an embodiment, the inner race of the slew bearing 156 can be fixed with respect to the table unit 120 and/or can be integral with the fixed portion 130. The drive unit 122 can thereby drive the motion of wheel portion 128, and thus the robot 102, through the driver member 146 providing a rotational force that is transmitted to the wheel portion 128 via rotatable engagement or connection between the driver member 146 and driven member 154. According to certain embodiments in which the driver and driven members 146, 154 are gears, the driven member 154 and driver member 146 can have a gear ratio, among other gear ratios, of about 4.24 to 1, with possible backlash being adjusted at installation and/or during maintenance.

As shown in the illustrated embodiment, according to certain embodiments, the driver member 146 can extend beyond the inner region 126 of the tower housing 118 so as to be positioned to engage the driver member 146 outside of the inner region 126 of the tower housing 118. Alternatively, according to certain embodiments, the driver and driven members 146, 154 can be disposed within the inner region 126 of the tower housing 118. Such a configuration can, according to certain embodiments, assist with the tower housing 118 being configured for explosion proof protection that can extend to the driver and driven members 146, 154, which can also assist with protecting the driver and driven members 146, 154 from contaminants that may be present in the work area.

Figures 7A, 7B, 8A, 8B:
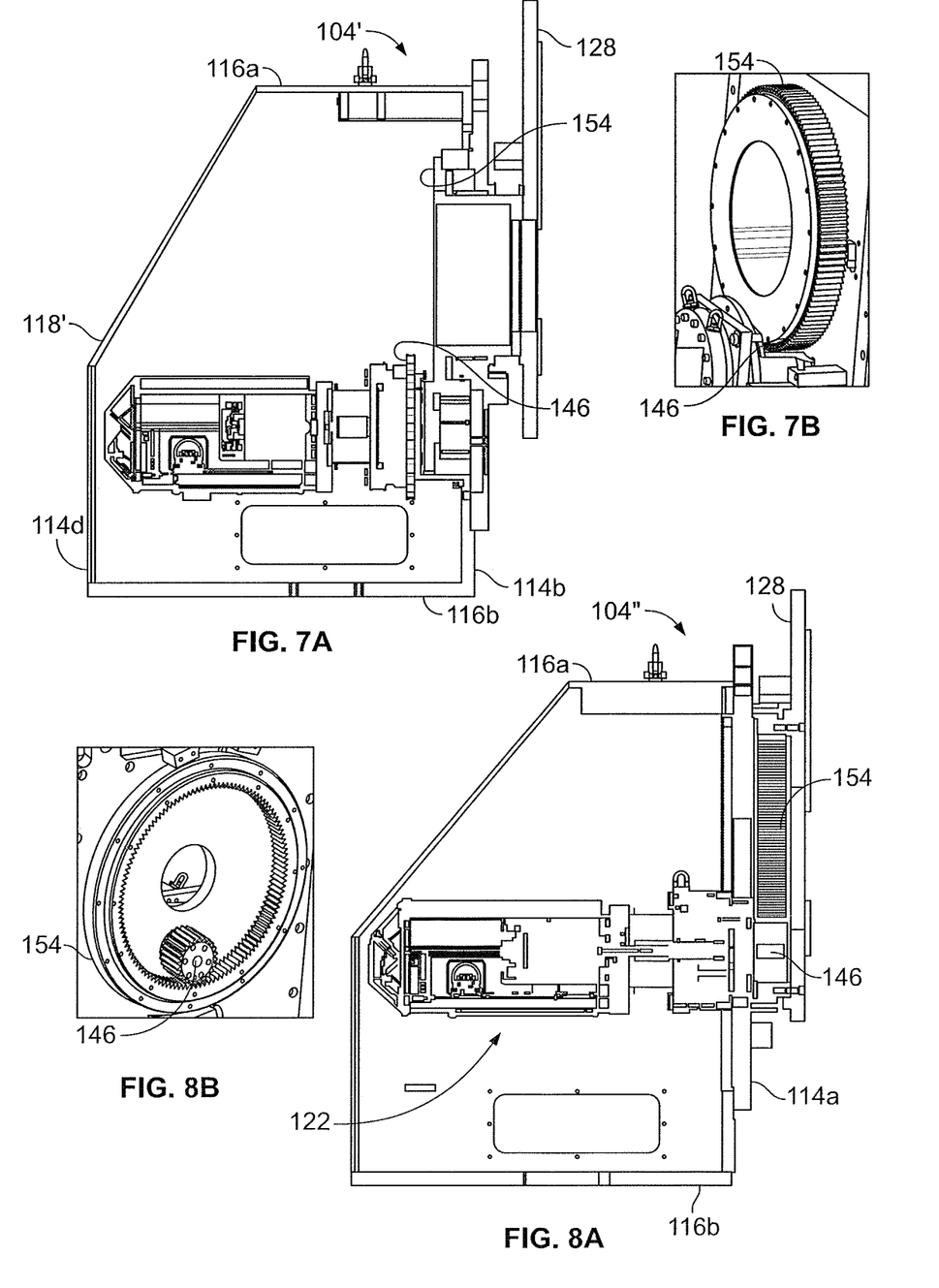
FIG. 7A illustrates a partial exploded side view of a supplemental axis unit according to an illustrated embodiment of the present application.
FIG. 7B illustrates an inset partial perspective view of a portion of the supplemental axis unit shown in FIG. 7A.
FIG. 8A illustrates a partial exploded side view of a supplemental axis unit according to an illustrated embodiment of the present application.
FIG. 8B illustrates an inset partial perspective view of a portion of the supplemental axis unit shown in FIG. 8A.

FIGS. 7A and 7B illustrate a partial exploded side view and an inset partial perspective view of a supplemental axis unit 104' according to another illustrated embodiment of the present application. As illustrated, the driver member 146 is a pinion gear that engages the external gear teeth of the driven member 154, such as, for example, the external teeth of a slew gear. Further, according to the illustrated embodiment, both the driver and driven members 146, 154 are disposed in the inner region 126 of the tower housing 118'. According to such an embodiment, one or more panels of the tower housing 118' and/or seals may be positioned so as to seal the inner region 126 of the tower housing 118' in a manner that can facilitate the tower housing 118' being configured for explosion proof protection.

FIGS. 8A and 8B illustrate a partial exploded side view and an inset partial perspective view of a supplemental axis unit 104" according to another illustrated embodiment of the present application. According to the embodiment depicted in FIGS. 8A and 8B, the driver and driven members 146, 154 are both positioned outside of the inner region 126 of the tower housing 118" and behind at least a portion of the table unit 120. Additionally, as shown by at least FIG. 8B, according to such an embodiment, the driver member 146 is a pinion gear that engages the internal gear teeth of the driven member 154, such as, for example, the internal teeth of a slew gear.

Figure 9:
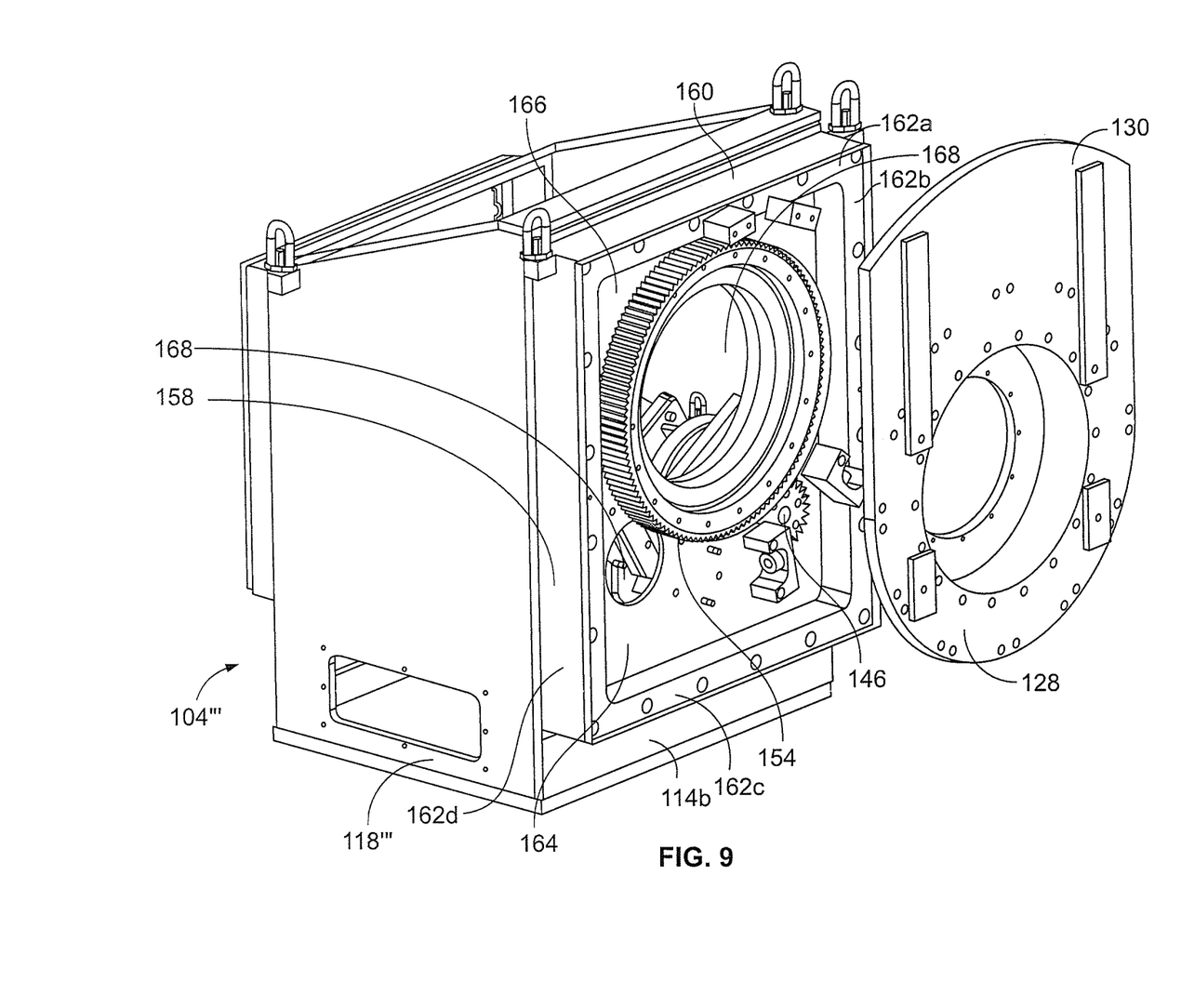
FIG. 9 illustrates a side perspective partial exploded view of a supplemental axis unit according to an embodiment of the present application.

FIG. 9 illustrates a side perspective partial exploded view of a supplemental axis unit 114''' according to another embodiment of the present application. As shown, the tower housing 118''' of the supplemental axis unit 114''' includes a collar unit 158 that is positioned outside of the inner region 126 of the tower housing 118'''. The collar unit 158 can include a frame portion 160 having a plurality of sidewalls 162a-d that generally defines an interior section 166 of the collar unit 158. The collar unit 158 can also include a rear wall 164 that is generally positioned between the inner region 126 of the tower housing 118''' and the interior section 166 of the collar unit 158. Further, the rear wall 164 can include one or more openings 168 that accommodate the interior section 166 being in fluid communication with the inner region 126 of the tower housing 118'''. Additionally, according to certain embodiments, the collar unit 158 can also include a front wall on a side of the collar unit 158 that is opposite of the location of the rear wall 164. According to certain embodiments, the front wall can be provided by a portion of the table unit 120, such as, for example, by the fixed portion 130 of the table unit 120. Further, according to such an embodiment, the fixed portion 130 can be sized relative to the collar unit 158 so as to as least assist in the collar unit 158 and/or the tower housing 118''' having explosion proof protection. As shown in FIG. 9, the interior section 166 of the collar unit 158 can be sized to accommodate placement of the driver and driven members 146, 154.

While the embodiments depicted herein illustrate a robotic system 100 that includes a supplemental axis unit 104 being used with a single robot 102, other configurations of robotic systems 100 can include multiple robots 102, as well as additional and/or other configurations or of supplemental axis units 104. Further, implementation robotic systems 100 of the present application can be utilized in connection with a moving line, such as, for example, work pieces that are displaced along a conveyor system, and can extend the reach work envelope or workspace of the robot 102 to accommodate the robot 102 being positioned to perform tasks or work at various locations on the conveyed work piece. Additionally, for example, according to certain embodiments in which the robot 102 is used in painting operations, use of a robot 102 with the supplemental axis unit 104 can assist the robot 102 in reaching various positions so that the robot 102 is positioned paint interior surfaces, exterior surfaces, or both, of the work piece. In such configurations, a robotic system 100 of the present application can replace two or more traditional robots. Additionally, in a stop and go line, the flexibility of the robotic system 100 of the present application allows for a greater or larger work envelope, and thus greater or larger reach, which can also increase efficiency while also reducing the overall footprint.

Figure 10:
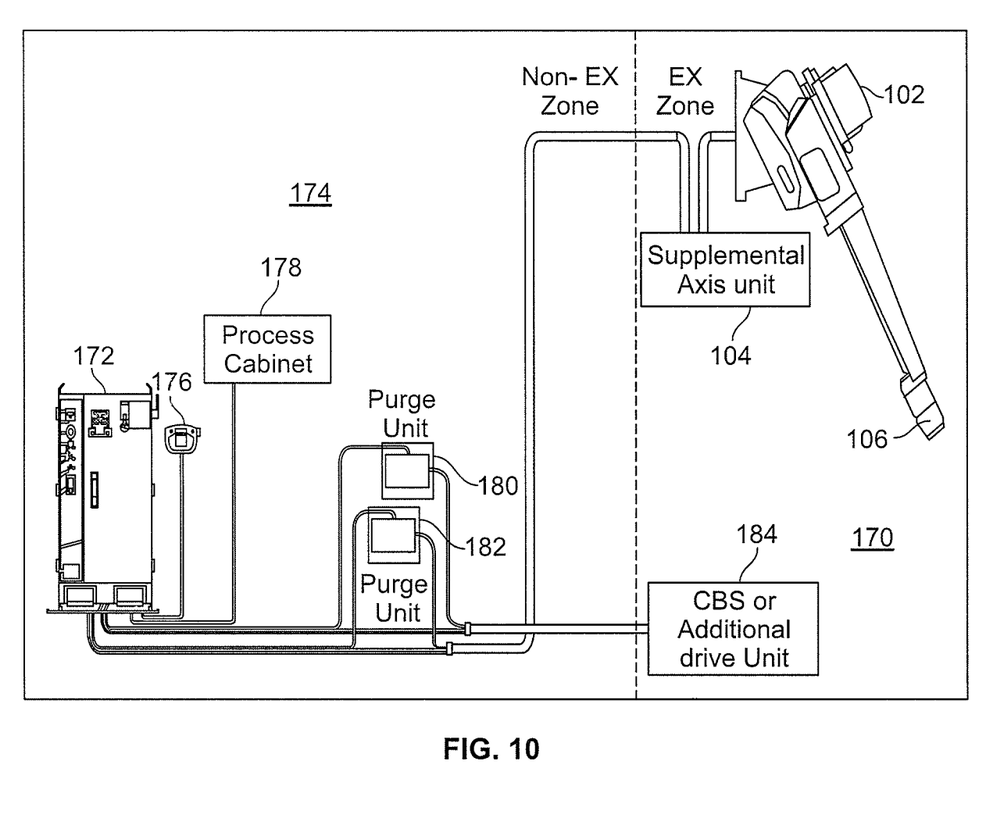
FIG. 10 illustrates a schematic view of an exemplary implementation of a robotic system having a supplemental axis unit according to an embodiment of the present application.

FIG. 10 illustrates a schematic view of an exemplary implementation of a robotic system 100 having a supplemental axis unit 104 and positioned within a work zone 170. According to the illustrated example, the robot 102 is a six axis robot that has six degrees of freedom, such as, for example, the IRB 5500 robot from ABB, Inc., such that the supplemental axis unit 104 provides a seventh axis for operation and/or movement of the robot 102. The robotic system 100 can include one or more controllers 172 in a control area 174. The controller 172 can be configured to provide a variety of functions, including, for example, be utilize in the selective delivery of electrical power to the robot 102 and/or to control the movement of the robot 102 and/or the operation of the supplemental axis unit 104. According to certain embodiments, in addition to controlling the movement of the robot 102, the controller 172 can also control the operation of the drive unit 122, and thereby control the rotational movement of the wheel portion 128 of the table unit 120 and the associated rotational position of the robot 102 relative to at least the supplemental axis unit 104. Moreover, controller 172 can be configured to dynamically control the movement of both the robot 102 itself as well as the movement of the wheel portion 128 to which the robot 102 is mounted, thereby dynamically controlling the robot 102 and supplemental axis unit 104 as an integrated unit. Additionally, such dynamic control of the robot 102 and the supplemental axis unit 104 can, at least according to certain embodiments, be based on one or more models stored in non-transient computer readable media in a controller 172, other computer, and/or memory that is accessible or in electrical communication with the controller 172. Further as previously mentioned, according to certain embodiments, the controller 172 can include a non-transient computer readable medium and processor for storing and executing computer readable instructions.

According to one aspect of the present teachings, the controller 172 is configured to dynamically control the robot 102 and the supplemental axis unit 104 as an integrated whole. In such a configuration, the controller 172 can include a model of the available range of motion of the combined robot 102 and supplemental axis unit 104, from which model the controller 172 can determine the movement(s) of the combined robot 102 and supplemental axis unit 104, including, for example, the movement of the robot 102 and supplemental axis unit 104 associated with preforming certain identified tasks on a workpiece. The robotic system 100 can also include a teaching pendant 176, which can provide a user interface configured to a user to input instructions to the controller 172 for coordinated action of the supplemental axis unit 104, the robot 102, and/or the end effector 106. The robot system 100 can also include a process cabinet 180 that can provide controls, power, and/or instructions relating to the operation of a variety of components of the robotic system 100, including, for example, instructions for the operation of certain aspects of the robot 102 or components that are coupled to or used in connection with the operation of the robot 102. For example, according to certain embodiments, the process cabinet 180 can be used to provide controls, power, and/or instructions to/for the end effector 106 and/or purge units 180, 182 that may be utilized in at least attempting to minimize the presence of combustible gases in at least certain portions of the work zone 170. Further, according to certain embodiments, the robotic system 100 can include an addition drive or Cartridge Bell System (CBS) 184, available from ABB, Inc. of Auburn Hills, that can be utilized in operating the robotic system 100 in painting applications. The CBS 184 can be located at a variety of locations, such as, for example, in the work zone 170 (as depicted) or the control area 174, among other locations in which the additional drive or CBS 184 can be operably disposed.

Figure 11:
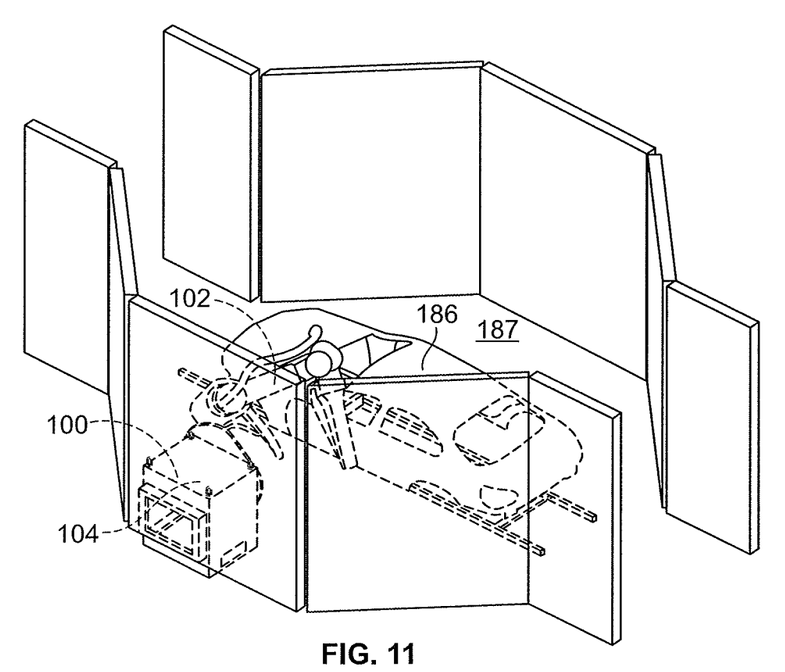
FIGS. 11 and 12 illustrate opposing side views of an exemplary robotic system that includes a supplemental axis unit painting a workpiece that is mounted on a rotating conveyor.
Figure 12:
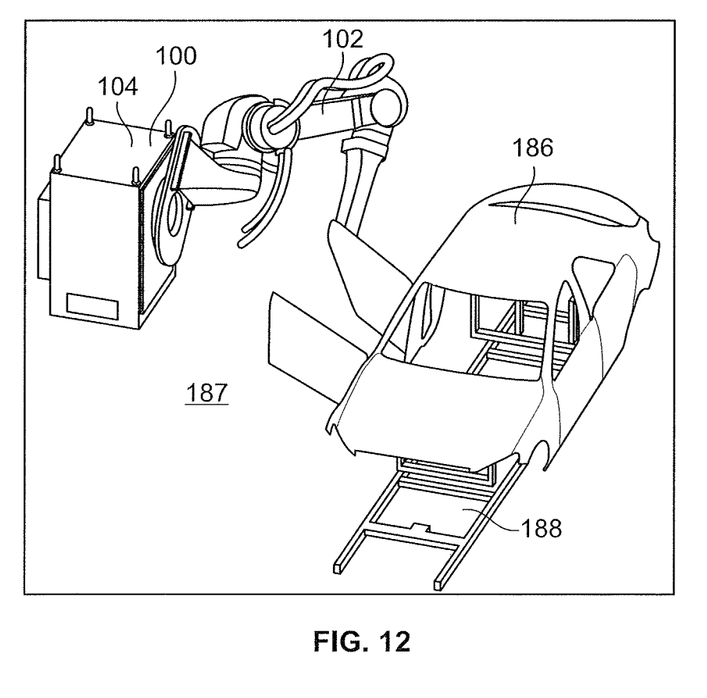

Referencing FIGS. 11 and 12, according to certain embodiments, the robotic system 100 can be utilized for painting a workpiece 186 that is displaced along a rotating conveyor 188 in a work space 187. In the depicted embodiment, the robotic system 100 includes a multi-axis robot 102 mounted to a supplemental axis unit 104 that adds an additional axis of/for movement of the robot 102. For example, as previously discussed, according to certain embodiments, the robot 102 can be a six axis robot 102. According to such an embodiment, with robot operably secured to the wheel portion 128 of the supplemental axis unit 104, the associated movement of the wheel portion 128 of the table unit 120 can facilitate the robot 102 being maneuvered or manipulated about a seventh axis. The inclusion of the seventh axis can allow the robot 102 to reach portions of the workpiece that traditionally were not accessible by a single robot. For example, in the depicted embodiment, the workpiece 186 is a car, the entirety of which can be painted by a single six axis robot 102 that is also displaceable relative to a seventh axis via the inclusion of the supplemental axis unit 104. According to such an embodiment, with the six axis robot 102 operably coupled to the supplemental axis unit 104, the robot 102 can be maneuvered into positions in which the robot 102. According to such an embodiment, the end effector 106 of the robot 102 can be positionable to paint both exterior and interior portions of the car workpiece 186, including, for example, the interior and exterior portions of doors, hood, trunk, and lid, among other portions of the workpiece 186.

Figure 13:
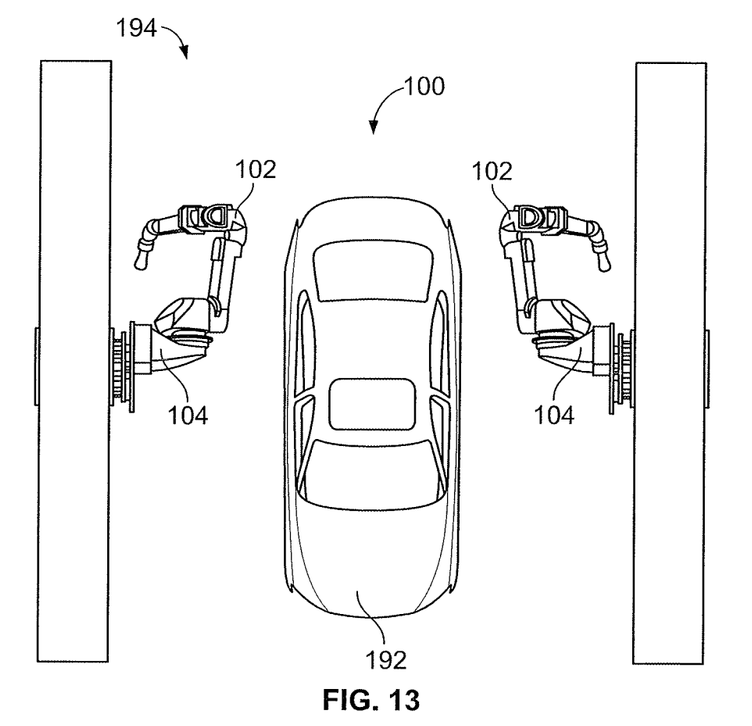
FIGS. 13 and 14 illustrate top and side perspective views, respectively, of an exemplary robotic system that includes a pair of robots that are each coupled to a supplemental axis unit that are each mounted atop a support.
Figure 14:
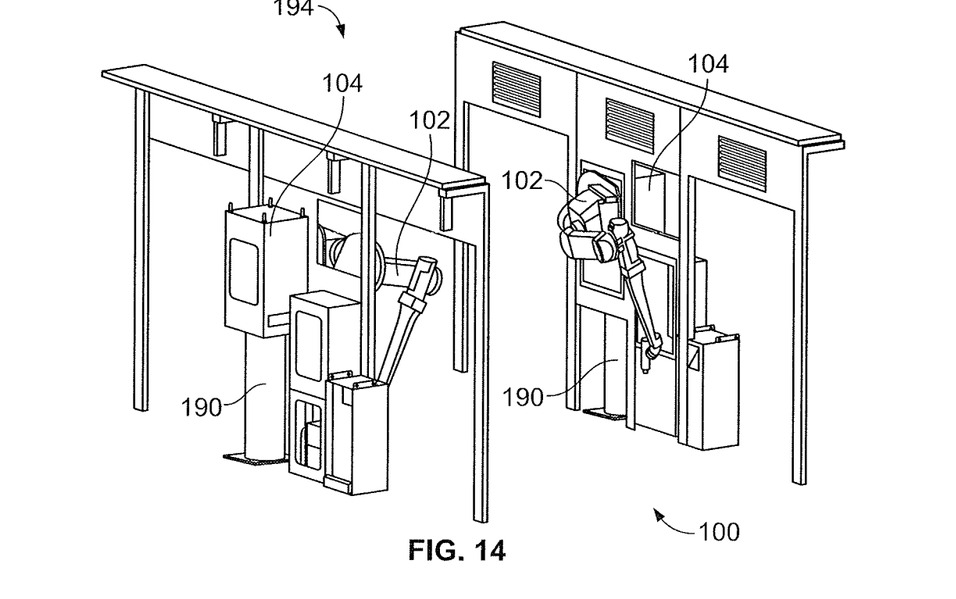

FIGS. 13 and 14 illustrate top and side perspective views, respectively, of an exemplary robotic system 100 that includes a pair of robots 102 that are each coupled to a supplemental axis unit 104 that are each mounted atop a support 190. According to the depicted exemplary embodiment, the robotic system 100 is configured to paint the exterior of a workpiece 192 disposed in a work area 194. According to certain embodiments in which the robots 102 are six axis robots, the seventh axis provided by operably mounting each of the robots 102 to a supplemental axis unit 104 can allow the system 100 depicted in FIGS. 13 and 14 to completely paint the exterior of a workpiece having a maximum length of about 5500 millimeters and a length of about 1900 millimeters. In comparison, similarly placed robots 102 without the supplemental axis unit 104 would typically generally be limited to painting workpieces having a maximum length of about 4500 millimeters.

Figure 15:
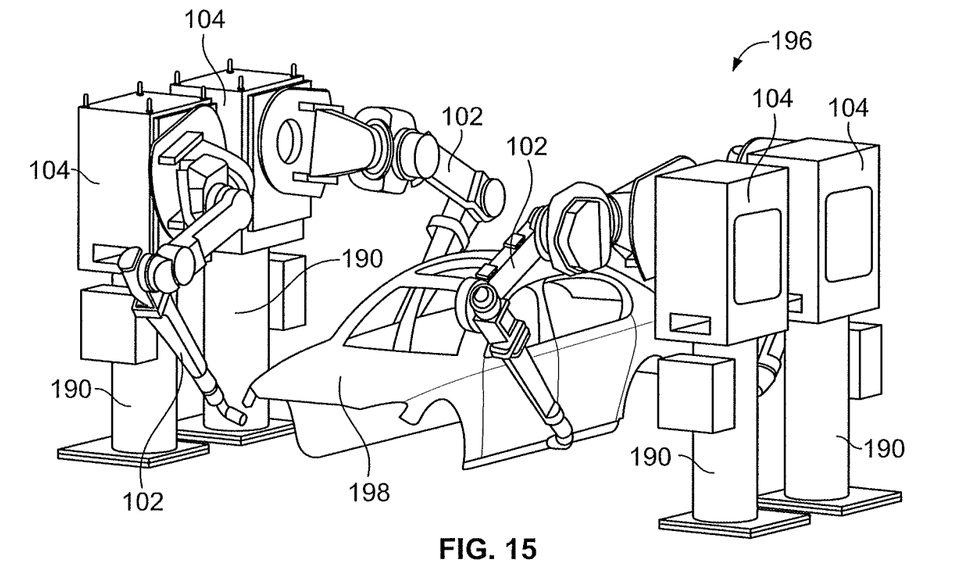
FIGS. 15 and 16 illustrate side perspective and side views, respectively, of a robotic system having two sets of robots positioned on opposing sides of a work area, with each robot mounted to a supplemental axis unit that is atop a support.
Figure 16:
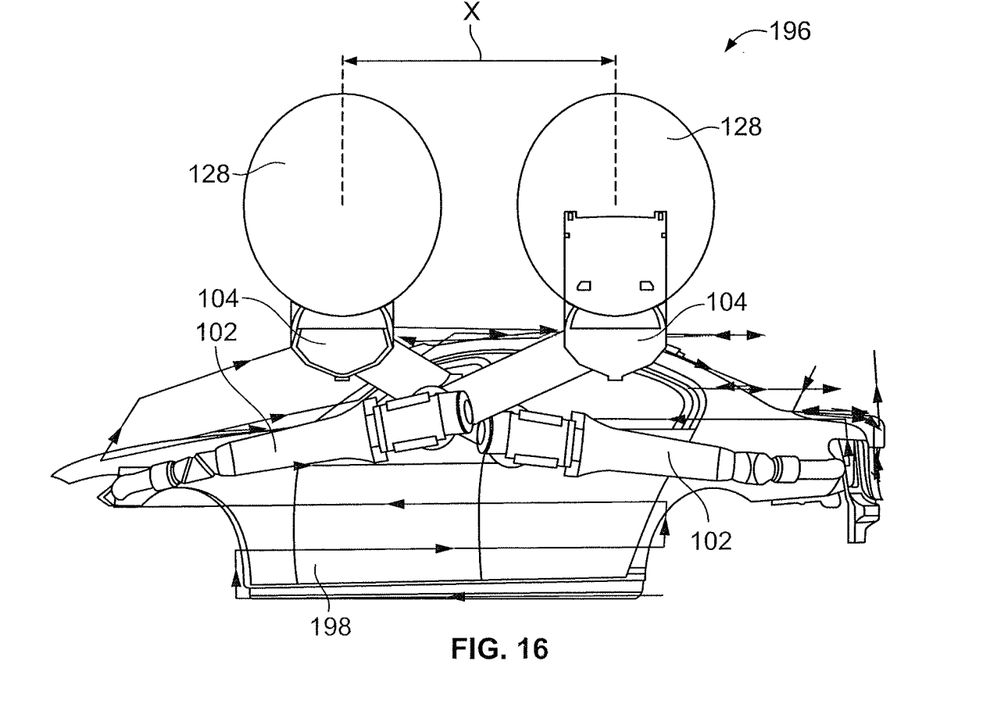

FIGS. 15 and 16 illustrate side perspective and side views, respectively, of a robotic system 100 having two sets of robots 102 positioned on opposing sides of a work area 196, with each robot 102 being mounted to a supplemental axis unit 104 that is atop a mount or support 190. As previously discussed, according to certain illustrated embodiments, the robots 102 are mounted to a rotatable wheel portion 128 of a table unit 120 of the supplemental axis unit 104. According to the exemplary embodiment depicted in FIGS. 15 and 16, the centers of the wheel portions 128 of adjacent supplemental axis units 104 can be separated by a distance X (as indicated by "X" in FIG. 16) along the direction of travel of the workpiece 198 through the work area 196. The distance between the centers of adjacent wheel portions 128 can vary. For example, according to certain embodiments, the distance between the centers of adjacent wheel portions 128 can be about 1500 millimeters along the direction of travel of the workpiece 198 through the work area 196. According to such a configuration, the two sets of two robots 102 that are each mounted to a supplemental axis unit 104 on either side of the work area 196 can reach the entire length of the exterior of the workpiece 198 that has a length of about 5500 millimeters. In comparison, four similar robots 102 disposed in the same locations in a fixed mount arrangement (e.g. without supplemental axis units 104) would generally be limited to painting the exterior of a similar workpiece having a maximum length of about 4500 millimeters.

Figure 17:
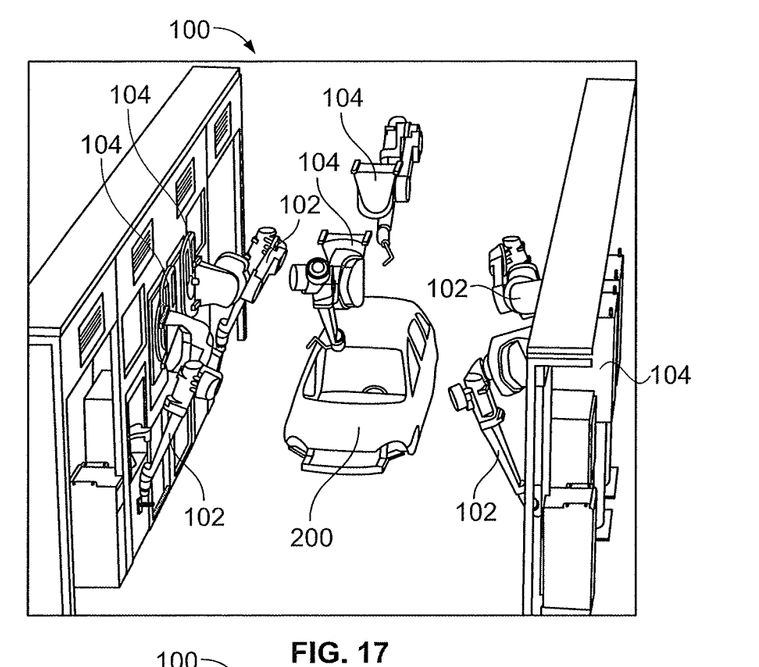
FIGS. 17 and 18 illustrate top and side perspective views, respectively, of a robotic system having two sets of robots positioned on opposing sides of a work area and a pair of robots extending for a ceiling, with each of the six robots mounted to a supplemental axis unit.
Figure 18:
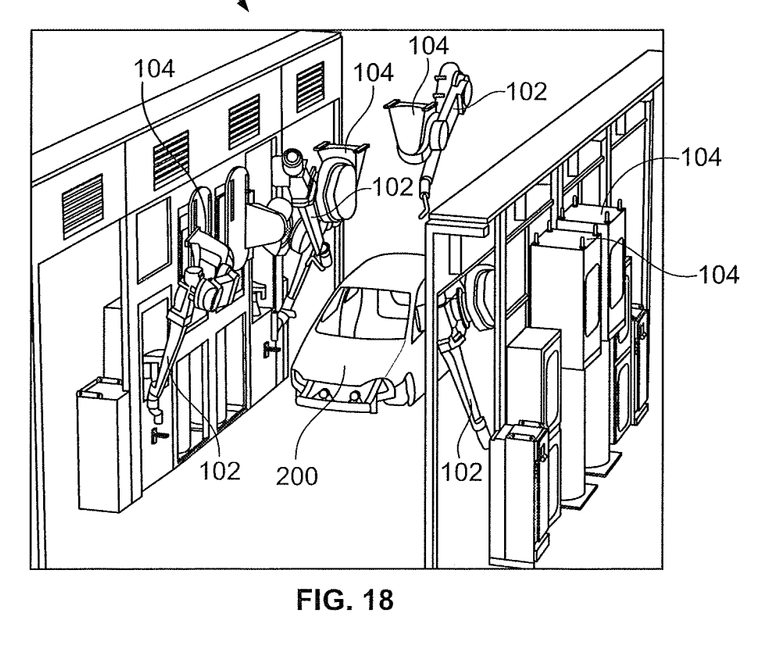

FIGS. 17 and 18 illustrate top and side perspective views, respectively, of a robotic system 100 having two sets of robots 102 positioned on opposing sides of a work area and a pair of robots 102 extending for a ceiling, with each of the six robots 102 mounted to a supplemental axis unit 104. According to such an embodiment, the four side robots 102 are secured to supplemental axis units 104 that are mounted on supports 1400 and can access work piece 200 in the work area, and can be programmed to work with the two ceiling mounted robots 102 on a workpiece 200. According to such an embodiment, at least some, if not all, of the robots 102 can be six axis robots, such that the inclusion of the supplemental axis unit 104 can allow the robot(s) 102 to be maneuvered or otherwise adjustable about a seventh axis, namely the axis provided by displacement of the robot 102 attributed to rotation of the wheel portion 128 of the table unit 120 of the supplemental axis unit 104. Such an embodiment can enhance the flexibility of the of the robotic system 100 so as to allow for easier access to regions in the interior of the workpiece 200 that typically would otherwise be more difficult to reach via the motion permitted by a fixed mount robot.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A robotic system comprising:
   a robot having one or more axes of movement;
   a drive unit including a driver member and a driven gear; and
   a supplemental axis unit having a table unit and a tower housing, the table unit having a fixed portion and a wheel portion, the wheel portion being pivotally coupled to the fixed portion, the fixed portion being secured to the tower housing and retains a relatively static position relative to the tower housing, the fixed portion having a driven gear secured at a fixed position relative to the rest of the fixed portion, an opening of the table unit extending along a central axis through both the fixed portion and the wheel portion and aligned with an aperture in a sidewall of the tower housing such that the opening is, through the aperture, in fluid communication with an inner region of the tower housing, the wheel portion structured to be coupled to the robot, the wheel portion further being selectively rotatably displaceable, at least when the robot is coupled to the wheel portion, about a supplemental axis and relative to at least the tower housing, the supplemental axis being different than the one or more axes of the robot, wherein the robot is mounted to the wheel portion at a location radially offset from the supplemental axis, the supplemental axis being vertically offset from the central axis, a foot unit of the robot covering at least a portion of the opening that extends through the wheel portion, and wherein the driven gear is positioned about the opening and outside of the inner region of the tower housing.

2. The robotic system of claim 1, wherein the robot has six axes of movement, the supplemental axis providing a seventh axis for movement of the robot, and wherein the robot further includes an end effector that is a painting or coating spraying device.

3. The robotic system of claim 1, wherein the driver member is positioned behind at least a portion of the table unit.

4. The robotic system of claim 3, wherein the drive unit includes a motor structured to provide rotational power for the selective rotational displacement of at least the driver member, the gear teeth of the driven gear, the wheel portion, and the robot, the motor being positioned within the inner region of the tower housing.

5. The robotic system of claim 3, wherein the driver member and the driven gear are housed within a collar unit positioned between the inner region of the tower housing and the table unit, and wherein a motor of the drive unit is positioned within the inner region of the tower housing.

6. The robotic system of claim 1, wherein the one or more axes of the robot comprises six axes.

7. The robotic system of claim 1, wherein the robot further includes an end effector, the end effector being a painting or coating spraying device.

8. The robotic system of claim 1, wherein the robotic system further includes one or more controllers configured to coordinate both (1) the movement of the robot about the one or more axes, and (2) the movement of the wheel portion about the supplemental axis.

9. The robotic system of claim 1, wherein the driver member is housed outside of the inner region of the tower housing.

10. A robotic system comprising:
a supplemental axis unit having a table unit, a drive unit, and a tower housing, the table unit having a fixed portion and a wheel portion, the wheel portion being pivotally coupled to the fixed portion, the fixed portion being secured to the tower housing and retains a relatively static position relative to the tower housing, the fixed portion having a driven gear secured at a fixed position relative to the rest of the fixed portion, an opening of the table unit extending along a central axis and through both the fixed portion and the wheel portion, the opening being aligned with an aperture in the tower housing such that the opening is, through the aperture, in fluid communication with an inner region of the tower housing, the wheel portion being selectively rotatably displaceable about a supplemental axis and relative to at least the tower housing, the supplemental axis being vertically offset from the central axis, a driven gear and at least a portion of a drive member of the drive unit being positioned around the opening and outside of the inner region of the tower housing,
a robot having six axes of movement, the robot being mounted to the wheel portion at a location offset in a radial direction away from the supplemental axis and selectively rotatably displaceable with the rotatable displacement of the wheel portion, the supplemental axis being different than the six axes of the robot and thereby providing a seventh axis of movement for the robot a foot unit of the robot covering at least a portion of the opening that extends through the wheel portion; and
at least one controller configured to coordinate both (1) the movement of the robot about the six axes, and (2) the rotatable displacement of the robot about the supplemental axis.

11. The robotic system of claim 10, wherein the drive unit engages gear teeth of the driven gear.

12. The robotic system of claim 11, wherein the drive unit includes a motor structured to provide rotational power for the selective rotation of at least the driver member, the gear teeth of the driven gear, the wheel portion, and the robot, the motor being positioned within the inner region of the tower housing.

13. The robotic system of claim 11, wherein the drive member and the driven gear are housed within a collar unit that is positioned between the table unit and the tower housing, and further wherein the tower housing has an explosion proof configuration, and wherein a motor of the drive unit is positioned within the inner region of the tower housing.

14. The robotic system of claim 13, wherein the table unit provides a portion of a front wall of the collar unit.

15. The robotic system of claim 10, wherein the robot is mounted to the wheel portion at a location between the supplemental axis and an outer radial edge of the wheel portion.

16. The robotic system of claim 10, wherein the robot further includes an end effector, the end effector being a painting or coating spraying device.

* * * * *